United States Patent [19]

Laursen

[11] 4,022,338
[45] May 10, 1977

[54] CONVEYOR LOADER DEVICE

[76] Inventor: Milton P. Laursen, 7504 Eureka Ave., El Cerrito, Calif. 94530

[22] Filed: July 12, 1976

[21] Appl. No.: 704,460

[52] U.S. Cl. .................................. 214/89; 198/482; 294/88; 198/678
[51] Int. Cl.² ......................................... B66B 17/00
[58] Field of Search ............. 214/89; 294/88, 83 R; 198/477, 678, 482; 104/250, 252, 89, 93

[56] References Cited

UNITED STATES PATENTS

| 3,194,383 | 7/1965 | Kuwertz | 198/678 |
| 3,799,318 | 3/1974 | Dekoekkoek | 198/477 |
| 3,917,112 | 11/1975 | Willis et al. | 198/678 |

Primary Examiner—Albert J. Makay
Attorney, Agent, or Firm—Robert R. Tipton

[57] ABSTRACT

A device for loading garment hangers onto a conveyor utilizes a vertically arranged elongated member fixed relative to a conveyor and on which is mounted a first elongated movable member which is longitudinally and vertically movable relative to the fixed member and which movable member also includes a second elongated member which is movable relative to the first movable member and connected thereto, the second movable member having a device for supporting the garment hanger located proximate its lower end with the first movable member having a retainer member located proximate its lower end and in engagement with the hanger support of the second movable member. Means are provided for lifting and lowering the first movable member with its connected second movable member and when aligned with the conveyor loading position the means for retaining the hanger is disengaged allowing the hanger and garment to slide by gravity onto the conveyor pick-up device.

5 Claims, 8 Drawing Figures

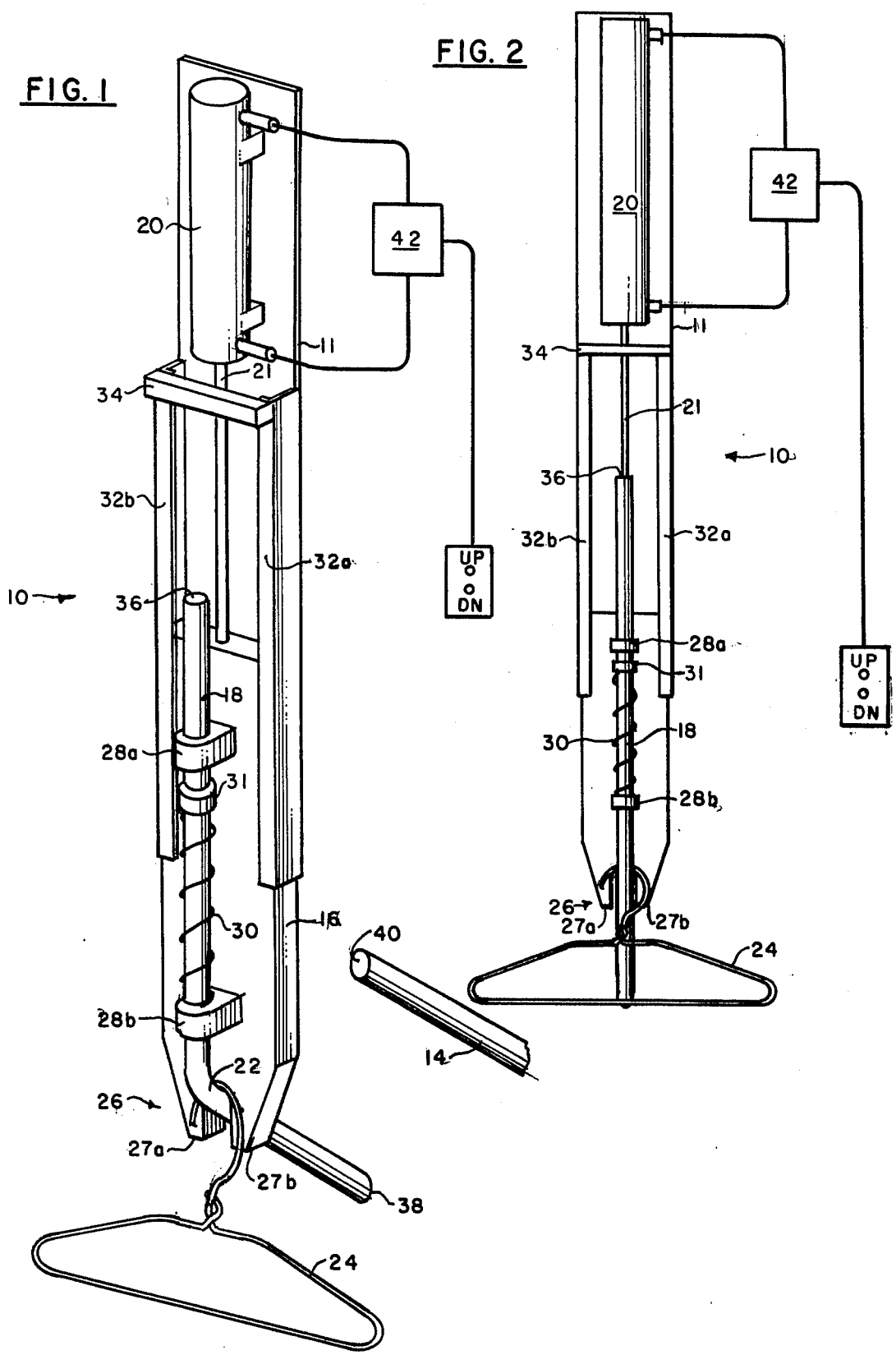

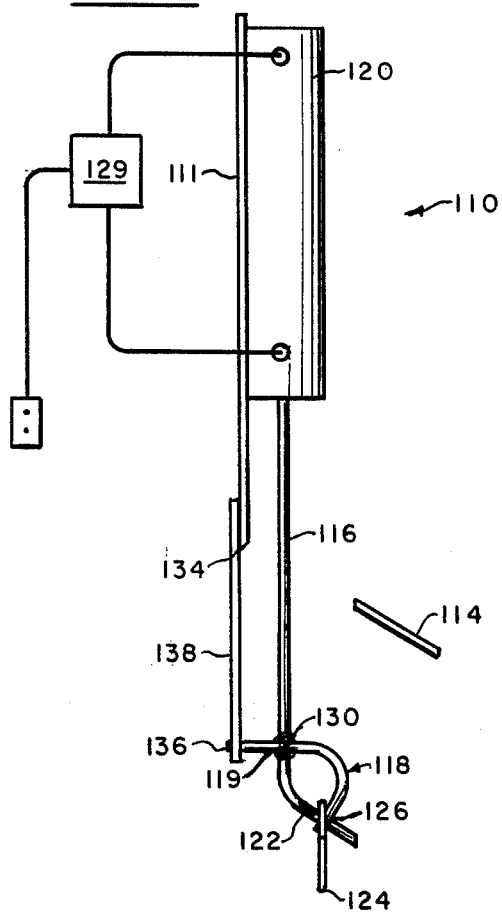
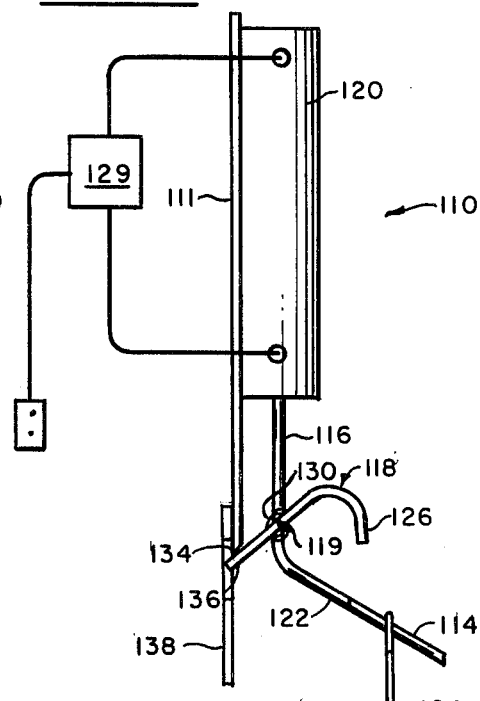
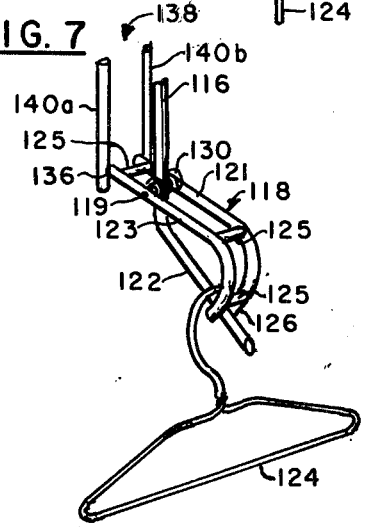

CONVEYOR LOADER DEVICE

BACKGROUND OF THE INVENTION

This invention relates generally to conveyor loader devices and in particular to devices for loading garment hangers from a garment loading position up to and onto a conveyor system.

In the clothing dry cleaning and laundry industry, conveyor systems are used extensively to eliminate much of the hand operations of moving the garments from one operation to the next, processing garments through an operation and for storing and possibly sorting the garments prior to pick-up by the customer. In the work area, in order to increase the availability of floor space the conveyor systems, of necessity, must be elevated so that workers and equipment can pass freely underneath. The conveyors are also elevated so that they can enter and exit process equipment. It is, therefore, a problem to load such conveyors when they are out of reach of the loading operator. The conveyor systems of the prior art attempt to solve this problem by providing a transition structure for lowering the entire conveyor system at the point of loading and then providing a second transition structure for raising the system during the rest of its journey around the plant. Such transitions can be somewhat expensive and limit the location for loading garments.

The apparatus of the present invention is a loading device which permits an operator to work at floor level to place the garment on a static hanger and then raise the garment and hanger to the conveyor level for loading on to the conveyor system.

SUMMARY OF THE INVENTION

The apparatus of the present invention comprises, basically, a vertically arranged elongated member connected in a fixed relationship to the conveyor system and extending downwardly with a first elongated movable member arranged parallel to and longitudinally movable relative to the fixed member plus a second elongated movable member arranged parallel to, longitudinally movable relative to, and movable with said first movable member. A means for supporting a hanger is located at the lower end of the second movable member and is in engagement with the means for retaining the hanger located at the lower end of said first movable member. A means for lifting and lowering the movable member relative to the fixed member is provided and a means is provided for disengaging the retainer device when the support member is aligned with the conveyor rack.

It is therefore an object of the present invention to provide a device for loading a conveyor.

It is also an object of the present invention to provide a device for assembly of a garment and hanger at a fixed location prior to loading it onto a continuously moving conveyor.

It is a further object of the present invention to provide a device for raising a clothes hanger containing a garment to an elevated position for loading onto a conveyor rack.

It is another object of the present invention to provide a device having two movable members one having a support for a hanger and the other having a means for engaging said support which is released upon alignment with the rack of the conveyor.

It is still another object of the present invention to provide a device for loading hangers onto a conveyor in which two movable members include a device for supporting a hanger containing a garment and a retainer normally engaged with said support which is disengaged when the support encounters a stop at the top of its travel and disengages the retainer releasing the hanger to the conveyor rack.

These and other objects of the present invention will be manifest upon study of the following detailed description when taken together with the drawings.

BRIEF DESCRIPTION OF THE DRAWINGS

FIG. 1 is an isometric view of the conveyor loader device of the present invention shown prior to release of the garment hanger to the conveyor rack.

FIG. 2 is a front elevational view of the conveyor loader device of the present invention shown in the lowered position.

FIGS. 6 and 6A are side elevational views of a further embodiment of the conveyor loader device of the present invention.

FIG. 7 is an isometric view of the hanger retainer apparatus of the conveyor loader device of FIG. 6 and 6A.

DESCRIPTION OF THE PREFERRED EMBODIMENT

Figure 3:
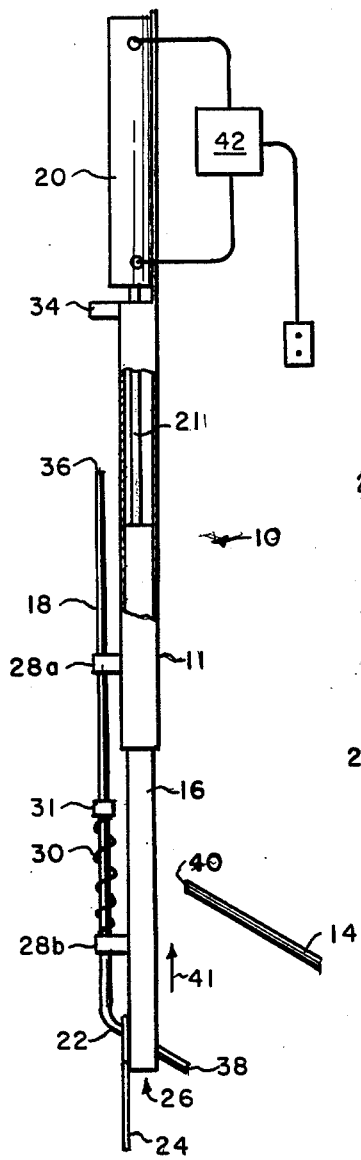
FIG. 3 is a side elevational view of the conveyor loader device of the present invention shown in the lowered position.

With reference to FIG. 1, the conveyor loader device 10 of the present invention comprises, basically, a fixed member 11, which is arranged in a fixed relation to conveyor loader rack 14, with a first elongated movable member 16 arranged parallel to and longitudinally movable relative to fixed member 11 and with second movable member 18 arranged parallel to, longitudinally movable relative to, and movable with said first movable member 16 both of which movable members are raised and lowered by pneumatic or hydraulic piston drive 20 attached to fixed member 11. The longitudinal axis of fixed member 11 and movable members 16 and 18 is defined as the main (long) or vertical axis of these members and the apparatus as a whole.

Conveyor loading rack 14 can be either the hook or retainer forming a part of the moving conveyor which is connected directly to the moving conveyor. Rack 14 can also be an intermediate storage rack for holding the hanger and garment which has been released from conveyor loader device 10 for engagement onto the conveyor hook or pick-up device at the moment it passes rack 14. The details of the conveyor are not shown since they are common in the art.

Located proximate the lower end of second movable member 18, is hanger support member 22 which is adapted to receive the hook of a typical coat hanger 24.

Located proximate the lower end of first movable member 16 is retainer means 26 comprising fingers 27a and 27b adapted to slide down around hanger support 22 to retain and prevent hanger 24 from sliding down support 22.

Second movable member 18 is spaced apart from first movable member 16 by spacer blocks 28a and 28b in which second movable member 18 is slideable up and down. A spring 30 is used about second movable member 18 to bias member 18 upwardly in engagement with retainer means 26.

A spline (not shown), guide block (not shown) or similar device common in the art, can also be incorporated in second movable member 18 to prevent it from rotating about it's longitudinal axis and to maintain end 38 in alignment with end 40 of rack 14. Normally, the friction between end 36 and stop 34 is sufficient to prevent rotation of member 18 when members 16 and 18 are in the raised position.

First movable member 16 is maintained in vertical alignment to slide up and down fixed member 11 by side guides 32a and 32b. A stop member 34 is connected to side guides 32a and 32b at their upper end and is adapted to engage the top end 36 of second movable member 18 when its lower end 38 is aligned with upper end 40 of rack 14.

The hydraulic or pneumatic control system 42 is similar to any such system common in the art and is, therefore, shown only in block diagram. Other devices common in the art could also be used such as belts, pulleys and chains using electric motor drives.

With reference to FIGS. 2 and 3, to operate the conveyor loader device of the present invention, movable members 16 and 18 are lowered to the garment loading position using actuating cylinder 20 driving piston rod 21 which is attached to first movable member 16, downwardly where a hanger is placed on support member 22 and a garment draped thereabout, which hanger is retained by fingers 27a and 27b of retainer member 26. It will be noted that spring 30 must be made strong enough to bias second movable member 18 and its lower connected support member 22 upwardly in engagement with retainer member 26 and overcome the weight of the garment (not shown) on hanger 24.

As shown in FIG. 3 the hanger and garment are now ready to be raised to the conveyor loading position.

Figure 4:
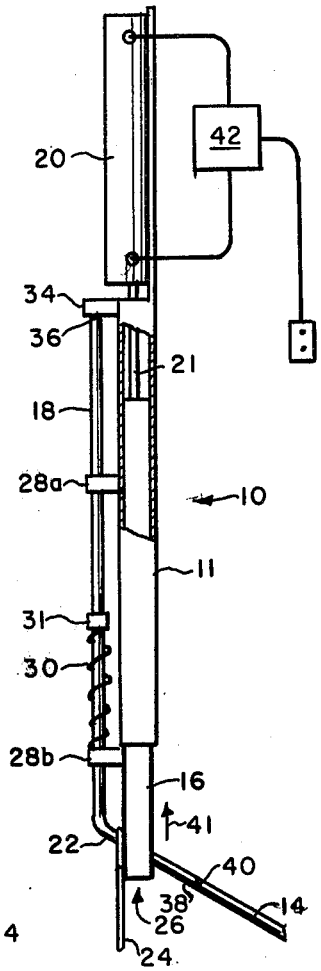
FIG. 4 is a side elevational view of the conveyor loader apparatus of the present invention shown in the raised position, but prior to release of the hanger retainer means.

With reference to FIG. 4, actuating cylinder 20 is actuated using hydraulic or pneumatic system 42 to pull piston rod 21 upwardly, raising movable member 16 and its connected second movable member 18 up to a position in which hanger support 22 is now aligned with conveyor rack 14. The top end 36 of second movable member 18 is shown in FIG. 4 just as it engages stop 34.

Figure 5:
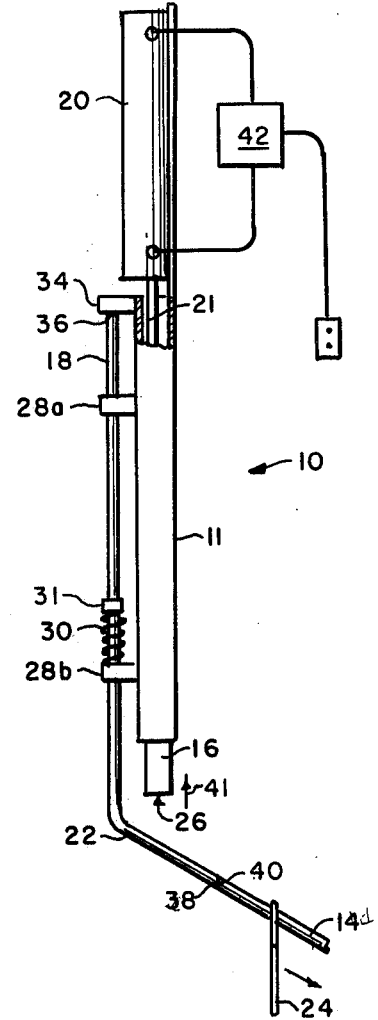
FIG. 5 is a side elevational view of the conveyor loader device of the present invention in the raised position showing the means for engaging the hanger in the release position with the hanger being transferred to the conveyor rack.

With reference to FIG. 5, actuating cylinder 20 is further activated upwardly, pulling first movable member 16 further upward whereby retainer means 26 is raised above support 22, since support 22 and second movable member 18 are fixed in position by stop 34. In the now raised position, first movable member 16, with its retainer member 26, is disengaged from support 26 and releases hanger 24 to slide down support 22 and on to rack 14 where it is then picked up by a conveyor (not shown).

With reference to FIGS. 6 and 6A, a further embodiment of the present invention is illustrated comprising a vertically arranged elongated fixed member 111 on which is attached actuating cylinder 120 used to raise and lower a pair of movable members 116 and 118.

Movable member 116 defines, in the embodiment illustrated, not only the piston rod for actuating cylinder 120, but also at its lower end where it is bent at an angle to its longitudinal axis, an object support 122. Pivotally connected to member 116 above support 122 is movable member 118 having an actuating end 136 and an object retaining end 126. FIG. 7 illustrates the detailed configuration at support 122 showing members 116, 118 and 122 in isometric view.

With reference to FIG. 7, member 118 comprises two curved rods or wire members 121 and 123 spaced apart by spacers 125 to define a two pronged fork adapted to engage support 122 at retainer means 126 of member 118 and retain and hold a clothes hanger 124 while being supported by member 122 when conveyor loading device 110 is in the lowered position.

A spring 130 is provided about pivot point 119 of member 118 in order to bias member 118 against support 122 at all time when support 122 is not aligned with conveyor rack 114.

To operate conveyer loader device 110, a hanger 124 is placed on support 122 above retainer end 126 of member 118 and then draped with a garment (not shown). Cylinder 120 is then actuated by a pneumatic or hydraulic actuating system 129, common in the art, to raise members 116, 118 and 122 upward to the level of conveyor rack 114.

With reference to FIG. 6A, as support member 122 reaches conveyor loading rack 114, actuating end 136 of member 118 engages stop 134 at the lower end of fixed member 111 causing member 118 to pivot in a counterclockwise direction about pivot 119 thus disengaging retainer end 126 from member 122 allowing hanger 124 to slide down member 122 and onto conveyor rack 114 for transport by the conveyor to another operating station.

To prevent rotation of piston 116 along with members 116, 118 and 122, so that member 122 will properly align with rack 114, a forked guide 138 is attached to fixed member 111 depending downwardly to a point just below actuating end 136. As shown in FIG. 7, forked guide 138 comprises two prong members 140a and 140b on each side of actuating end 136.

I claim:

1. An apparatus for loading an object onto a conveyor comprising
   a vertically arranged elongated fixed member,
   a first elongated movable member arranged parallel to and longitudinally movable relative to said fixed member,
   means for retaining said object, said means located proximate the lower end of said first movable member.
   a second elongated movable member arranged parallel to, movable relative to, and movable with said first movable member,
   means for supporting said object, said means located proximate the lower end of said second movable member and adapted to engage said means for retaining said object when said first and second movable members are in the lowered position.
   means for lifting and lowering said first movable member relative to said fixed member,
   means for aligning said means for supporting said object, with said conveyor, and
   means for disengaging said means for retaining said object when said means for supporting said object and said conveyor are aligned to receive said object whereby said alignment and disengagement occurs upon stopping of the vertical movement of the first movable member while continued vertical movement of the second movable member releases the object.

2. The apparatus as claimed in claim 1 further comprising
a spring adapted to bias said means for retaining said object in engagement with said means for supporting said object.

3. The apparatus as claimed in claim 1 wherein said means for aligning said means for supporting said object comprises
a stop attached to said fixed member and adapted to engage said second movable member when said means for supporting an object is aligned with said conveyor to receive said object.

4. The apparatus as claimed in claim 1 wherein said means for supporting an object comprises
an elongated support member adapted to receive said object connected proximate the lower end of said second movable member and depending downward at an angle sufficient to permit said object to slide down said elongated support member.

5. The apparatus as claimed in claim 4 wherein said means for retaining said object comprises
a two pronged fork member adapted to engage and depend about said elongated support member.

* * * * *